Patented Dec. 16, 1952

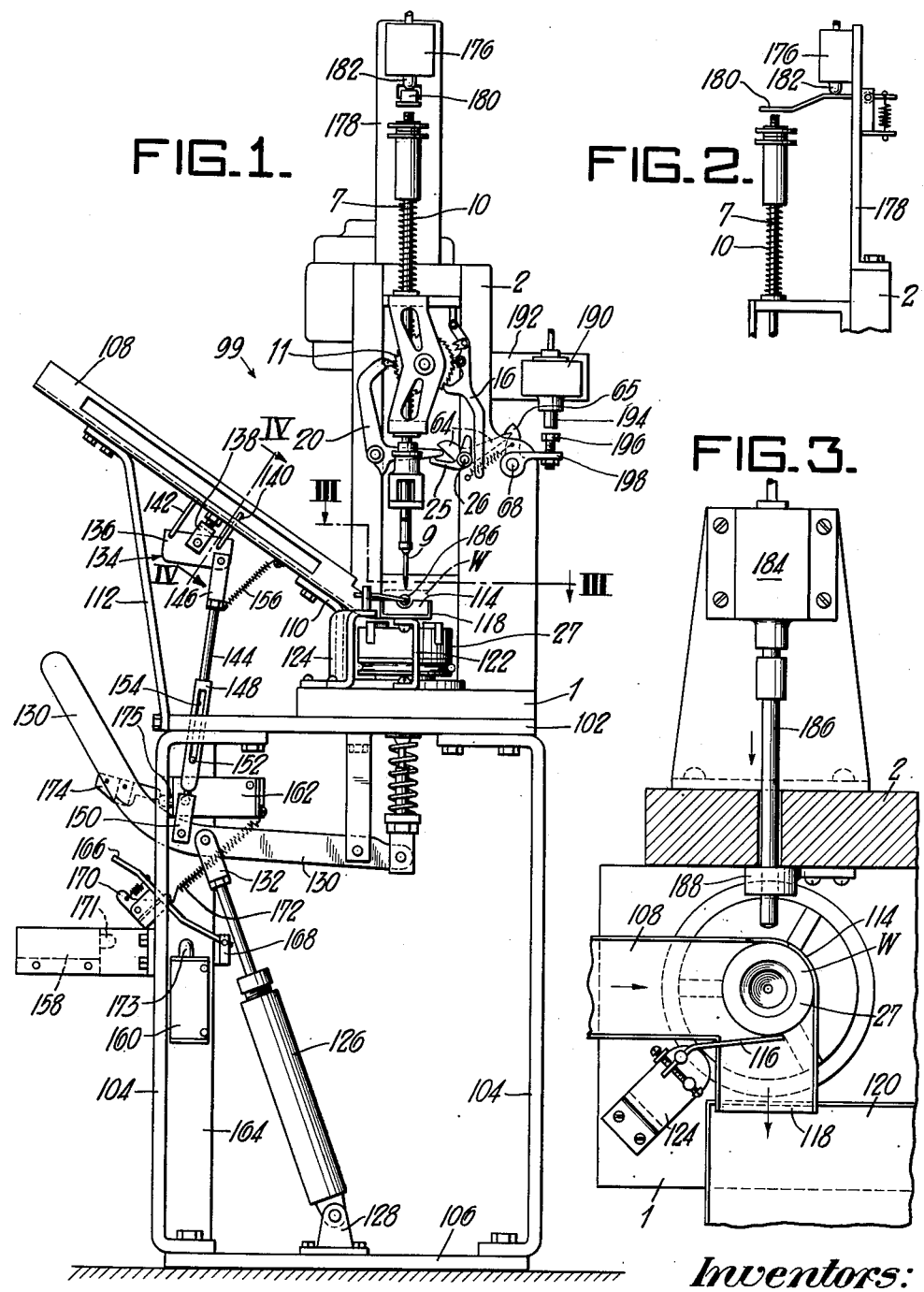

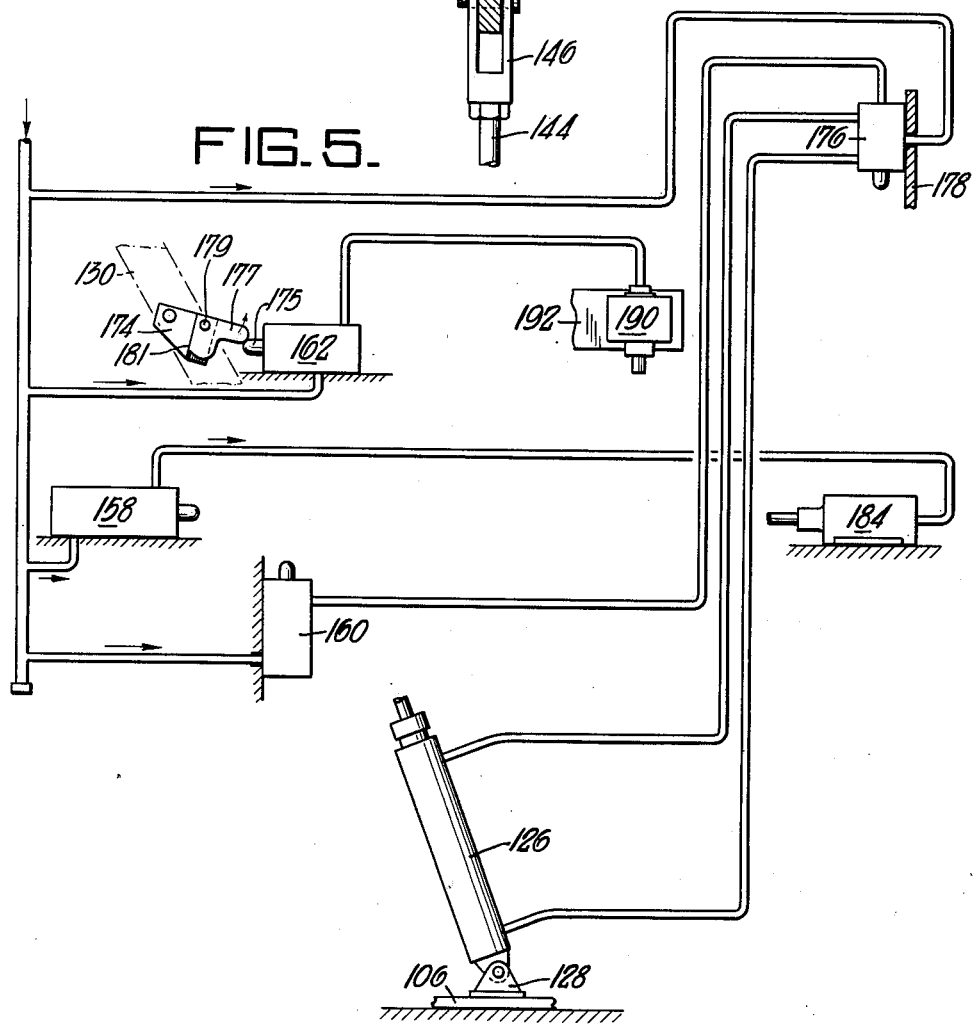

2,621,448

UNITED STATES PATENT OFFICE 2,621,448

AUTOMATIC FEED FOR DIE MACHINING APPARATUS

Marshall H. MacMeans, Bedford, and Clarence J. Oberdoerster, University Heights, Ohio, assignors to United States Steel Company, a corporation of New Jersey Application July 3, 1951, Serial No. 235,044

6 Claims. (Cl. 51—67)

The present invention relates to a fluid operated mechanism which functions to automatically feed wire-drawing die blanks to a die machining apparatus and to eject the processed dies from the apparatus at the conclusion of the machining operation.

Prior to our invention, in the operation of a die machining apparatus, such as the hole lapping machine described by A. D. Kutzler in his Patent No. 2,391,983, it was necessary for the operator to manually place each die blank to be processed in the chuck of the machine and then remove it after the hole therein had been lapped. The machine was stopped automatically after each lapping operation and remained inactive until the die was replaced by the operator. One operator usually attended to several machines so that production time was lost whenever a machine completed its operation while the operator was busy with another machine. This occurred quite frequently.

It is an object of our invention to eliminate loss of production time and otherwise speed up the machining of dies by providing a device for feeding rough dies to and ejecting processed dies from a wire-drawing die processing machine which device is fully automatic in operation and is actuated by an element of the die processing machine itself.

The invention will be fully apparent from the following detailed disclosure and the appended claims when read in connection with the accompanying drawings in which:

Figure 1 is a front elevation of the die lapping machine of our invention;

Figure 2 is a side elevation of the top part of the machine of Figure 1;

Figure 3 is a view taken on the line III—III of Figure 1;

Figure 4 is a sectional view taken on the line IV—IV of Figure 1; and

Figure 5 is a diagrammatic showing of the fluid system of the invention.

Referring more particularly to the drawings, reference numeral 99 indicates generally a die lapping machine principally of the same type disclosed in the above mentioned Kutzler patent. The machine shown differs somewhat, however, from the Kutzler machine in that it is provided with the automatic chuck which is the subject of the Richard L. Coan patent application, Serial No. 167,859, filed June 13, 1950, now Patent No. 2,610,860, and entitled "Automatic Chuck." The complete operation and arrangement of parts of the chuck are described in the Coan application and it is not thought necessary to repeat the detailed description here except to point out that the jaws of the chuck are actuated to alternately release or grip a workpiece held therein by depressing or raising a lever 130. (The lever 130 is designated by the reference numeral 38 in the Coan application.)

In order to impart greater clarity to the description and to avoid confusion, the same reference numerals have been applied to the various parts of the Kutzler die lapping machine shown in Figure 1 as those used in the above mentioned patent, while the elements of our invention have been indicated by the reference numerals 100 and above with the exception of the lever arm 130 which is referred to above.

The base 1 of the die lapping machine, as shown in Figure 1, is mounted on a platform 102 which is suitably supported by legs 104 which in turn are bolted to a base plate 106. A die blank storage rack or magazine 108, consisting of an open top rectangular trough, may be supported in an angular position by means of legs 110 and 112 which are fastened at their lower ends to the base plates 1 and 102 respectively. The rack is preferably of a width equal to the diameter of the casings of the die blanks being processed. The lower end of rack 108 terminates in a right-angle pocket section 114 which is centered immediately above the chuck 27 and is made up of extensions of the three sides of rack 108, as shown in Figure 3. The back side of the pocket 114 is curved on a radius equal to the radius of the casings of the die blanks being processed by the machine. A spring loaded finger 116, mounted at the corner of pocket 114, serves as a confining and centering means for the dies as they enter the pocket from rack 108. The exit end 118 of pocket 114 is at right-angles to the entrance end and constitutes a short trough section which directs the processed dies into a box-like container 120 after they are ejected from the chuck 27. Pocket section 114 is supported by a leg 122 which is bolted to base 1 and finger 116 is pivotally mounted on a support 124 which is also bolted to base 1.

In the present invention, chuck 27 is actuated, through lever 130, by a double acting air cylinder 126 which is pivotally mounted in a bracket 128 which in turn is bolted to the base 106. The piston rod of cylinder 126 is pivotally attached to the lever 130 by means of a yoke 132.

A gate mechanism 134 controls the feeding of die blanks W from the rack 108 to the chuck 27 and consists of a small plate member 136 pivotally mounted to the underside of rack 108 by means of a bracket 138 and two U-shaped pin members 140 and 142 pivotally mounted on plate 136. The ends of the U-shaped pin members 140 and 142 project through suitable openings in the bottom of rack 108 and serve as stop means for the dies carried therein. Gate mechanism 134 is also actuated by means of the air cylinder 126 through a linkage consisting of a rod member 144, pivotally secured to the plate 136 by a yoke 146, and a sleeve member 148 pivotally joined to the arm 130 by means of a yoke 150. A pin 152 extends laterally from the end of the rod 144 and is carried in a slot 154 of the sleeve 148 to allow a predetermined amount of downward travel to take place by the arm 130 before it reaches the end of the slot 154 to cause actuation of the gate mechanism 134. Pin member 140 is maintained in raised position with its upper edge above the bottom of rack 108 during the initial downward travel of arm 130 by means of a tension spring 156. Spring 156 also raises the pin 140 when the arm 130 starts its upward travel from its lowermost or chuck opening position. When the ends of U-shaped pin member 140 project upward through the bottom of rack 108, while the ends of member 142 are flush with the bottom of the rack 108, as shown in Figure 1. The distance between members 140 and 142 is equal to the diameter of the die casings carried by the rack. With this arrangement, it can be readily seen that only one die blank is allowed to be fed from the rack 108 to the chuck 27 upon actuation of this gate mechanism because pin member 142 will hold back the succeeding die blanks in the rack when gate 134 is open and pin member 140 is in the retracted position.

Air valves 158, 160 and 162 are fastened to legs 104 and 164 and are operated through the movement of the lever 130. A lever arm 166, which is pivotally secured to the leg 164 by means of a bracket 168, has a spring loaded dog 170 attached thereto which actuates the valve 158 on the downward stroke of lever 130. Lever 130 bears against the end of arm 166 and depresses the same causing the dog 170 to engage the plunger 171 of the valve 158 to actuate it. Further downward travel of the lever 130 causes the arm 166 to contact the plunger 173 of valve 160 to actuate it at the completion of the downward stroke of lever 130. Dog 170 pivots past valve 158 without actuating it when the lever 130 travels upward. Arm 166 is brought back to its starting position by means of a tension spring 172. A dog 174, which is fastened to the lever 130, actuates plunger 175 of the air valve 162 at the completion of the upward travel of lever 130 and pivots past this plunger without actuating it when the lever moves downwardly. The lever portion 177 of the dog 174 is pivoted as at 179. An abutment wall 181 is provided on the dog for limiting the movement of the lever portion in the clockwise direction while permitting relatively free pivotal movement in the counterclockwise direction. This arrangement makes it possible for the lever 177 to pivot past plunger 175 without actuating it on the downward stroke of the lever 130. When the lever 130 moves upwardly, the wall 181 causes the lever portion 177 to remain rigid so that the plunger 175 is actuated.

A four-way air valve 176 is mounted on a bracket 178 which is bolted to the top of the support 2 of the die lapping machine 99. An actuating lever 180 for the valve 176 is pivotally mounted on the bracket 178 immediately below the valve plunger 182.

As described in the Kutzler patent, when the lapping operation is completed a projection (not shown) on the rod 7 strikes a limit switch (not shown) which, by means of a solenoid rocks a shaft 26. The movement of the shaft 26 moves a bellcrank 25, which is keyed on to the shaft 26 adjacent one end, far enough to move the ends of levers 16 and 20 far enough in a radial direction away from the ratchet wheel 11, to completely free all of the pawls from the ratchet teeth of the wheel 11, this completely frees the rod 7 from restraint so that the spring 10, which constantly biases the rod 7 upwardly, moves the rod 7 abruptly upward. Valve 176 is actuated by the rod 7 when it is jerked upwardly.

Actuation of air valve 176 by the rod 7 directs air into the top of air cylinder 126 thus causing lever 130 to be pulled downwardly. The downward movement of lever 130 causes chuck 27 to release its hold on die W and raise the die upwardly free of the jaws of the chuck. Further downward movement of the lever 130, as explained above, causes the air valve 158 to be actuated. Actuation of the air valve 158 directs air into an air cylinder 184 which is positioned above and behind the chuck 27. The piston rod 186 of the cylinder 184 projects through the die lapping machine support 2 and is guided by means of a bushing 188 to a point just behind pocket 114 and on the center line of the chuck 27 and trough 118. Actuation of the air cylinder 184 causes the piston rod 186 to move forward and push die W out of the chuck 27, past finger 116 and into the die container 120 positioned underneath the end of the trough 118.

Immediately after the actuation of air cylinder 184 and the ejection of the die from the chuck 27 and prior to the actuation of air valve 160, gate 134 is opened and a die is allowed to slide from the rack 108 into the pocket 114 and onto the upraised pad of chuck 27. Air valve 160 is now actuated which results in the resetting of the four-way valve 176 and the directing of air into the bottom of the cylinder 126 which forces the lever 130 upward thus closing the jaws of chuck 27 on the die in the pocket 114. After the closing of the jaws of chuck 27 and just prior to the termination of the upward travel of lever 130, air valve 162 is actuated which results in the directing of air into an air cylinder 190 which is affixed to the side of support 2 by means of a bracket 192. The directing of air into the cylinder 190 causes the piston rod 194 thereof to move downwardly into contact with the head of an adjustable bolt 196 affixed to the end of a lever 198 which is secured to a shaft 68 of the die lapping machine 99. The downward movement of piston rod 194 causes the lever 198 to be moved a sufficient distance in a clockwise direction to result in the release of a catch 64 from a sear 65. As shown in the Kutzler patent, the catch 64 is keyed to shaft 26 adjacent the end thereof remote from the bellcrank 25. The sear 65 is located in the path of the catch 64 so that when the shaft 26 is rocked to rotate the bellcrank 25 and cause the rod 7 to be jerked upwardly, the catch 64 is rotated and caught by the sear 65. The sear 65 is keyed onto the rotatable shaft 68 adjacent the lever 198. The catch 64, sear 65, and shaft 68 and their functioning, are all described in the Kutzler patent referred to above and are not claimed as part of this invention. A more detailed description of the operation of the die lapping machine is not thought necessary to a clear understanding of the present invention. It will suffice to state that the release of the catch 64 puts the die lapping machine 99 in operation and causes tool 9 and rod 7 to be fed downwardly until tool 9 passes through the die blank disposed on the chuck 27. When tool 9 passes through the die blank, the die lapping automatically stops and tool 9 is withdrawn from the die as rod 7 moves upwardly to its topmost position where it contacts lever 180 as explained hereinbefore.

While one embodiment of our invention has been shown and described it will be apparent that other adaptations and modifications may be made without departing from the scope of the following claims.

We claim:

1. Apparatus for feeding wire-drawing die blanks and the like to a lever-operated chuck of a die machining device, said die machining device being adapted to hold said blanks while being machined by a rod-supported tool and having automatic means effective to lift said rod away from said blank on completion of machining, and means for starting the machining operation after a finished die blank has been replaced; said apparatus comprising a frame member disposed adjacent said chuck-operating lever, a first power means supported on said frame and connected with said chuck-operating lever, said first power means being adapted to shift said lever to open and close said chuck, a first control means mounted on said frame in the path of said chuck-operating lever, said first control means being adapted to be actuated by said lever at the beginning of its operating stroke, second power means operatively connected with said first control means and disposed on said frame adjacent the chuck and being adapted to eject a finished blank from said chuck when actuated by said first control means, a blank-holding magazine mounted on said frame adjacent said chuck, feeding means mounted on said magazine adapted to feed blanks singly from said magazine to said chuck, said feeding means being operatively connected with said chuck-operating lever whereby said feed means is actuated after predetermined movement of said lever, a second control means mounted on said frame in the path of said lever and adapted to be actuated by said lever upon further movement thereof, said second control means being connected with said first power means and adapted to actuate said first power means to shift said lever to chuck-closing position when actuated, and actuating means mounted on said frame and connected with the machining operation starting means for actuating said starting means.

2. Apparatus as defined in claim 1 characterized by said first power means including a pivotally mounted first fluid cylinder having a piston rod projecting therefrom, said piston rod being pivotally connected at its projecting end to said lever, and a first fluid valve connected to said cylinder for directing fluid into the same for moving said piston inwardly, said valve being disposed in the path of the rod supporting said tool and adapted to be actuated thereby when said tool is lifted on completion of the machining operation.

3. Apparatus as defined in claim 2 characterized by said second control means for actuating said first fluid cylinder to shift said lever to chuck-closing position including a fourth fluid valve adapted to reset said first fluid valve to direct fluid into said first cylinder to move the piston rod thereof outwardly, said fourth fluid valve being positioned in said frame at the end of the path of said lever and being adapted to be actuated thereby after predetermined movement of said lever to open said chuck.

4. Apparatus as defined in claim 1 characterized by said second power means adapted to eject a finished blank from said chuck including a second fluid cylinder having a piston rod projecting therefrom adjacent said chuck, and said first control means connected with said second fluid cylinder including a second fluid valve.

5. Apparatus as defined in claim 1 characterized by said blank-holding magazine including an open top rectangular trough disposed at an angle to the horizontal with its lower end fitted around said chuck; and said feed means including a plate member pivotally mounted to the underside of said trough intermediate its ends, a pair of spaced stop members attached to and projecting from said plate member, the projecting ends of said stop members being adapted to be inserted alternately through spaced openings in the underside of said rack upon pivotal motion of said plate to cause a single blank to slide down said trough onto said chuck, a rod pivotally attached to one end of said plate member, a pin projecting laterally from the end of said rod remote from said plate member, an elongated sleeve having a lengthwise slot in one side thereof disposed around said rod with said pin slidably fitted in said slot, said sleeve being pivotally connected to said lever whereby said plate member is pivoted after said lever has moved a sufficient distance to permit the end of said slot to engage said pin.

6. Apparatus as defined in claim 1 characterized by said means for actuating the machining operation starting means including a third fluid cylinder having a supply line connected thereto and a piston rod projecting therefrom adapted to actuate the machining operation starting means, and a third fluid valve disposed in the supply line to said cylinder and in the path of said lever, said third fluid valve being adapted to be actuated by said lever when the same moves to the position in which the chuck is closed.

MARSHALL H. MacMEANS.
CLARENCE J. OBERDOERSTER.

REFERENCES CITED

The following references are of record in the file of this patent:

UNITED STATES PATENTS

| Number | Name | Date |
| --- | --- | --- |
| 556,054 | Haskins | Mar. 10, 1896 |
| 1,570,156 | Kingsbury | Jan. 19, 1926 |
| 1,946,429 | Smith | Feb. 6, 1934 |
| 2,191,930 | Arms | Feb. 27, 1940 |
| 2,391,983 | Kutzler | Jan. 1, 1946 |
| 2,462,327 | Mills | Feb. 22, 1949 |